(12) United States Patent
Seo et al.

(10) Patent No.: US 11,063,868 B2
(45) Date of Patent: Jul. 13, 2021

(54) OPERATION METHOD OF A COMMUNICATION NODE IN NETWORK

(71) Applicants: Hyundai Motor Company, Seoul (KR); Kia Motors Corporation, Seoul (KR)

(72) Inventors: Kang Woon Seo, Seoul (KR); Dong Ok Kim, Goyang-si (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/599,803

(22) Filed: Oct. 11, 2019

(65) Prior Publication Data

US 2020/0044970 A1 Feb. 6, 2020

Related U.S. Application Data

(62) Division of application No. 15/493,414, filed on Apr. 21, 2017, now Pat. No. 10,484,280.

(30) Foreign Application Priority Data

Apr. 21, 2016 (KR) .................. 10-2016-0048930

(51) Int. Cl.
*H04L 12/741* (2013.01)
*H04L 1/00* (2006.01)
*H04L 12/721* (2013.01)
*H04L 29/08* (2006.01)
*H04L 12/44* (2006.01)
(Continued)

(52) U.S. Cl.
CPC .............. *H04L 45/745* (2013.01); *H04L 1/00* (2013.01); *H04L 45/66* (2013.01); *H04L 67/12* (2013.01); *H04L 61/6022* (2013.01); *H04L 69/40* (2013.01); *H04L 2012/40273* (2013.01); *H04L 2012/445* (2013.01)

(58) Field of Classification Search
CPC ......... H04L 45/745; H04L 1/00; H04L 45/66; H04L 67/12; H04L 61/6022; H04L 69/40; H04L 2012/40273
See application file for complete search history.

(56) References Cited

U.S. PATENT DOCUMENTS 9,124,529 B1 * 9/2015 Chadha .................. H04L 45/02
2006/0089757 A1 4/2006 Yoshimura et al.
(Continued)

OTHER PUBLICATIONS

U.S. Notice of Allowance dated Jul. 11, 2019 issued in U.S. Appl. No. 15/493,414.
(Continued)

*Primary Examiner* — Jae Y Lee
(74) *Attorney, Agent, or Firm* — Morgan, Lewis & Bockius LLP

(57) ABSTRACT

An operation method of a first communication node comprises: receiving a first frame from a second communication node; obtaining a destination address of the first frame; and transmitting a second frame including an indicator for indicating an occurrence of an error in the first frame to a communication node corresponding to a source address of the first frame, when a port corresponding to the destination address does not exist in a routing table.

7 Claims, 6 Drawing Sheets

(51) Int. Cl.
  *H04L 29/12*   (2006.01)
  *H04L 29/14*   (2006.01)
  *H04L 12/40*   (2006.01)

(56) References Cited

U.S. PATENT DOCUMENTS

2010/0031106 A1\*  2/2010  Isoyama ............ H04L 12/4625
                                          714/746
2016/0344601 A1   11/2016  Kaku
2018/0091251 A1\*  3/2018  Hanneman, Jr. ... H04Q 11/0066

OTHER PUBLICATIONS

U.S. Non-Final Office Action dated Feb. 4, 2019 issued in U.S. Appl. No. 15/493,414.

\* cited by examiner

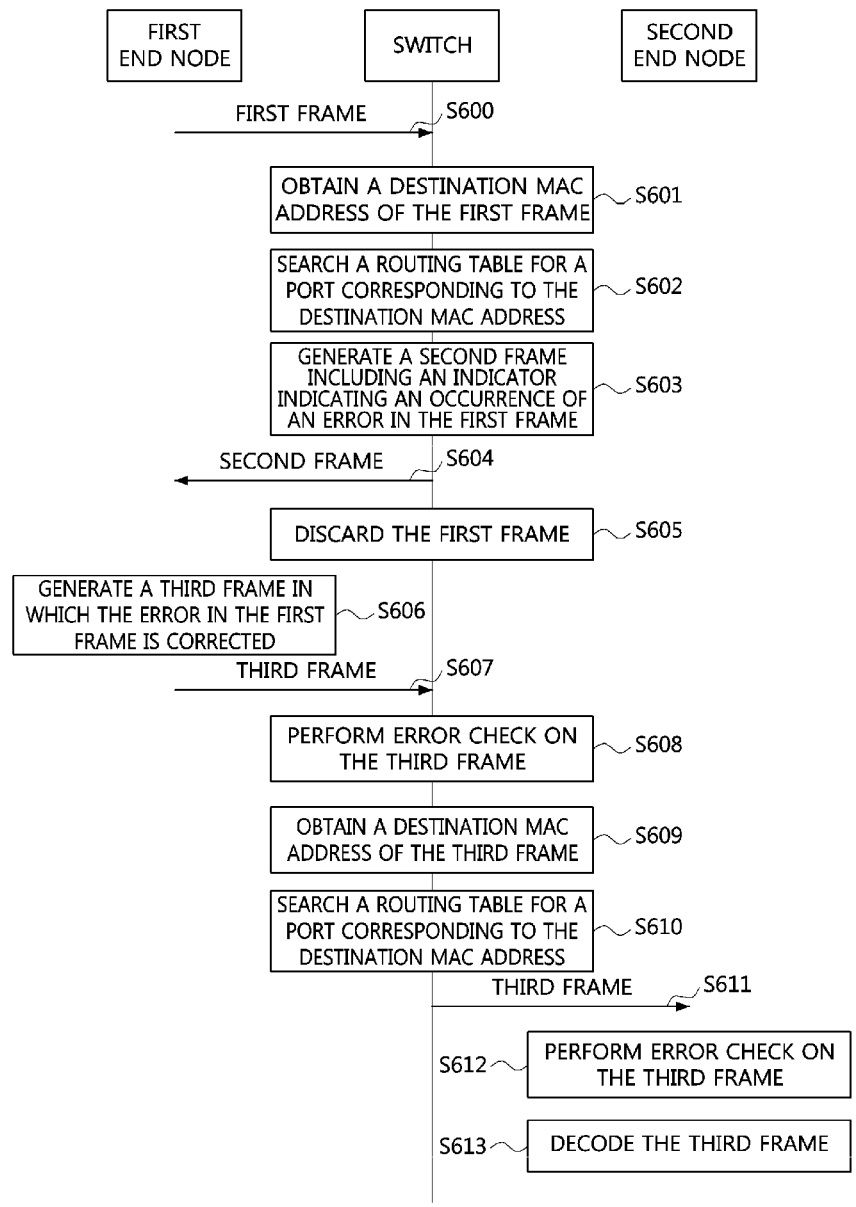

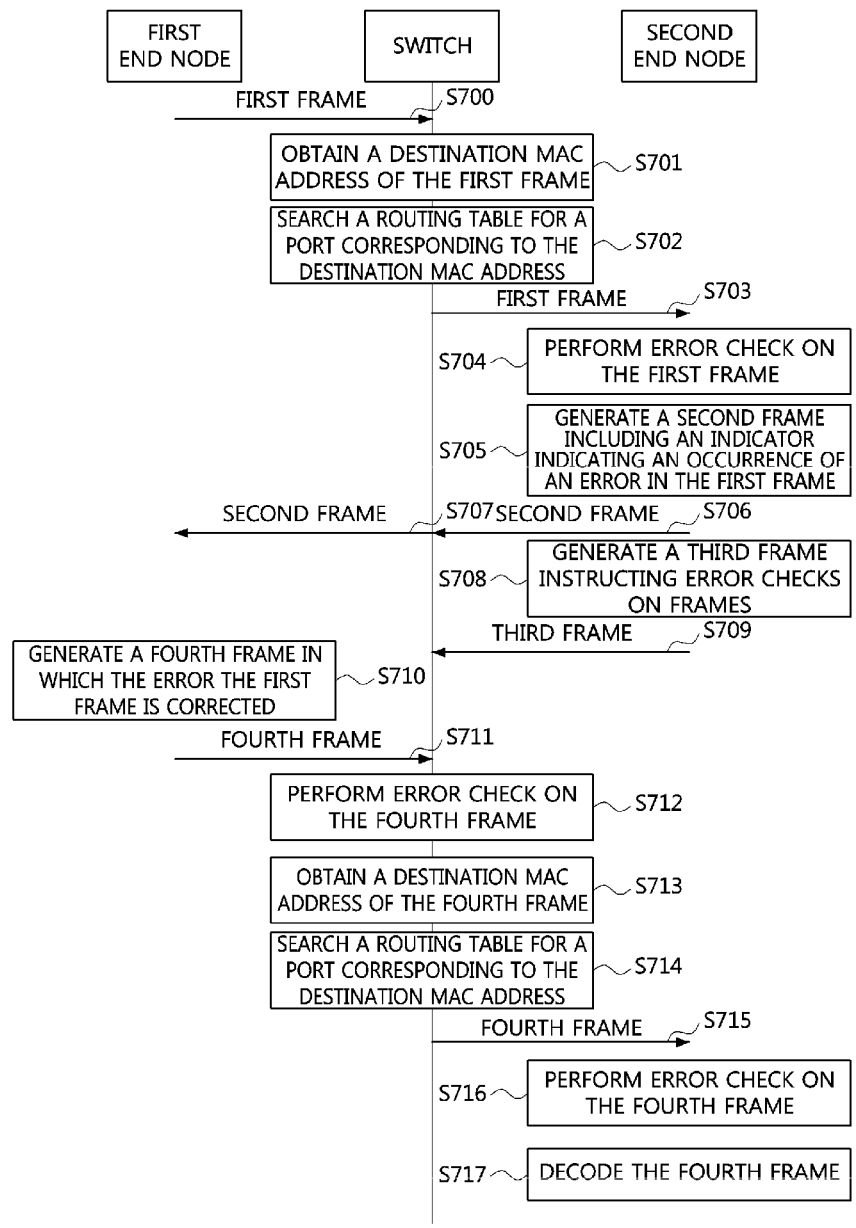

OPERATION METHOD OF A COMMUNICATION NODE IN NETWORK

CROSS-REFERENCE TO RELATED APPLICATIONS

This application is a divisional patent application of U.S. patent application Ser. No. 15/493,414, filed on Apr. 21, 2017, which claims the benefit of priority to Korean Patent Application No. 10-2016-0048930, filed on Apr. 21, 2016, the entireties of which are incorporated by reference as if fully set forth herein.

TECHNICAL FIELD

The present disclosure relates to an operation method of a communication node in a network, and more specifically, to an operation method for resolving routing errors occurring when a destination address of a frame transmitted by a communication node has an error.

BACKGROUND

Electronic devices installed in a vehicle have been increased significantly in their number and variety along with recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, like most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps. The Ethernet-based vehicle network may include a plurality of communication nodes. The communication node may be a gateway, a switch (or bridge), an end node, or the like.

The Ethernet-based vehicle network may comprise a plurality of communication nodes. A communication node may be a gateway, a switch (or a bridge), an end node, or the like. The plurality of communication nodes constituting the vehicle network can transmit and receive frames to each other.

In the IEEE 802.1Qcc standard, when a communication node operating as a switch or a bridge receives a frame, it may decide a routing path by referring to the destination MAC address information and the internal routing table without a separate error check on the frame. Then, the communication node may configure a port (for example, a transmission port) used for transmission of the frame based on the determined routing path, and transmit the frame through the configured port. However, if the destination MAC address of the frame includes an error, the communication node may have a problem that the frame is transmitted to a wrong destination. That is, the communication node may generate an error in the routing process of the frame due to the error of the destination MAC address of the frame. In addition, since the communication node maintains the frame transmission scheme currently used even when such the error occurs, there is a problem that errors occur continuously in the routing process of the continuous frames.

SUMMARY

The present disclosure provides methods for resolving a frame routing error caused by an error in a destination address of a frame at a communication node constituting a vehicle network.

In accordance with embodiments of the present disclosure, an operation method of a first communication node in an Ethernet-based vehicle network may comprise: receiving a first frame from a second communication node; obtaining a destination address of the first frame; and transmitting a second frame including an indicator for indicating an occurrence of an error in the first frame to a communication node corresponding to a source address of the first frame, when a port corresponding to the destination address does not exist in a routing table.

The destination address may be obtained from a medium access control (MAC) header of the first frame.

The operation method may further comprise discarding the first frame.

The second frame may further include an indicator for instructing correction of the error in the first frame.

The second frame may further include an indicator for instructing transmission of an error-corrected frame in which the error in the first frame is corrected.

The operation method may further comprise receiving a third frame from the second communication node; performing an error check operation on the third frame; obtaining a destination address of the third frame when the third frame has no error; and transmitting the third frame through a port corresponding to the destination address of the third frame based on the routing table.

The first communication node may be a switch or a bridge, and the second communication node may be an end node connected to the first communication node.

The first communication node may support a cut-through frame routing scheme.

According to another exemplary embodiment of the present disclosure, an operation method of a first communication node in an Ethernet-based vehicle network may comprise: receiving a first frame from a second communication node;

obtaining a destination address of the first frame; transmitting the first frame through a port corresponding to the destination address based on a routing table of the first communication node; receiving a second frame including an indicator indicating an occurrence of an error in the first frame from a third communication node receiving the first frame; and transmitting the second frame to a communication node corresponding to a source address of the first frame.

The destination address may be obtained from a medium access control (MAC) header of the first frame.

The second frame may further include an indicator for instructing correction of the error in the first frame.

The second frame may further include an indicator for instructing transmission of an error-corrected frame in which the error in the first frame is corrected.

The operation method may further comprise receiving a third frame from the third communication node, the third frame including an indicator requesting to perform the error check operation; receiving a fourth frame from the second communication node; performing the error check operation on the fourth frame; obtaining a destination address of the fourth frame when the fourth frame has no error; and transmitting the fourth frame through a port corresponding to the destination address of the fourth frame based on the routing table.

The first communication node may be a switch or a bridge, and the second communication node and the third communication node may be end nodes connected to the first communication node.

The first communication node may support a cut-through frame routing scheme.

According to another exemplary embodiment of the present disclosure, an operation method of a first communication node in an Ethernet-based vehicle network may comprise: receiving a first frame from a second communication node; performing an error check operation on the first frame; generating a second frame including an indicator indicating an occurrence of an error in the first frame when the first frame has the error; and transmitting the second frame to a communication node corresponding to a source address of the first frame.

The first frame may be a frame on which the second node does not perform the error check operation.

The error in the first frame may be identified by performing a cyclic redundancy check on the first frame based on a frame check sequence (FCS) included in a FCS field of the first frame.

The operation method may further comprise generating a third frame including an indicator requesting to perform the error check operation; and transmitting the third frame to the second communication node.

The first communication node may be an end node connected to the second communication node, and the second communication node may be a switch or a bridge.

The second communication node may support a cut-through frame routing scheme.

According to the embodiments of the present disclosure, in an Ethernet-based vehicle network, a communication node using a cut-through frame routing scheme defined in the IEEE 801.1Qcc standard is able to stop the cut-through frame routing scheme, when a routing error of a frame occurs due to an error in a destination MAC address of the frame. In addition, the communication node using the cut-through frame routing scheme can reduce a load on the vehicle network by preventing unnecessary frame transmission and reception caused by the error of the destination MAC address of the frame.

BRIEF DESCRIPTION OF DRAWINGS

Embodiments of the present disclosure will become more apparent by describing in detail forms of the present disclosure with reference to the accompanying drawings, in which:

FIG. 6 is a sequence chart illustrating an operation method of a first communication node in an Ethernet-based vehicle network according to an embodiment of the present disclosure; and FIG. 7 is a sequence chart illustrating an operation method of a first communication node in an Ethernet-based vehicle network according to another embodiment of the present disclosure.

Figure 1:
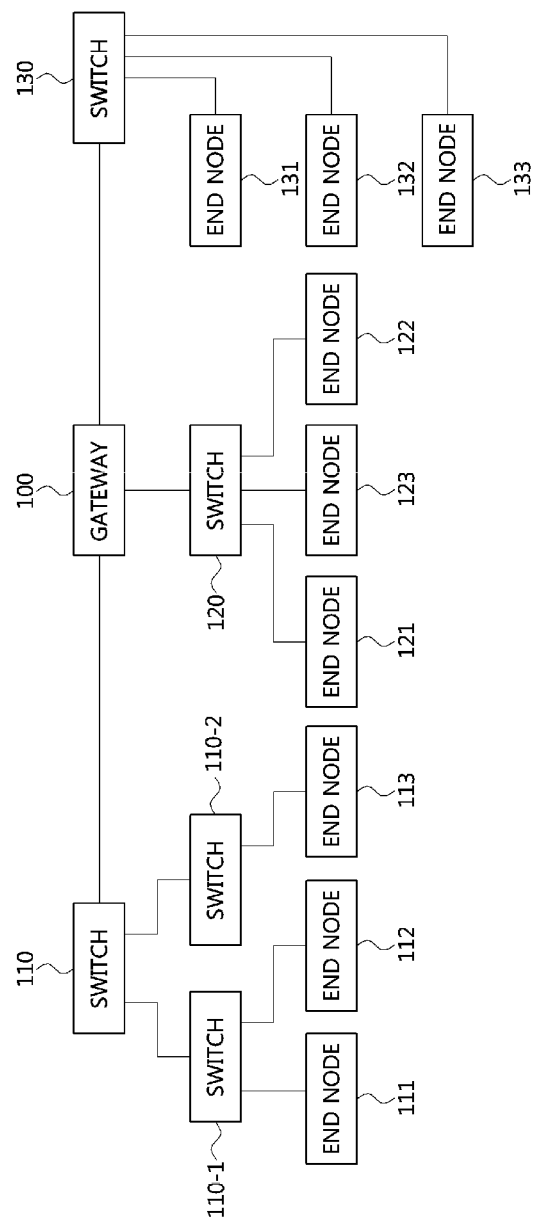
FIG. 1 is a diagram showing a vehicle network topology according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, a control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram showing a vehicle network topology according to an exemplary embodiment of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Embodiments of the present disclosure may be applied to the foregoing network topologies. The network topology to which forms of the present disclosure may be applied is not limited thereto and may be configured in various ways.

Figure 2:
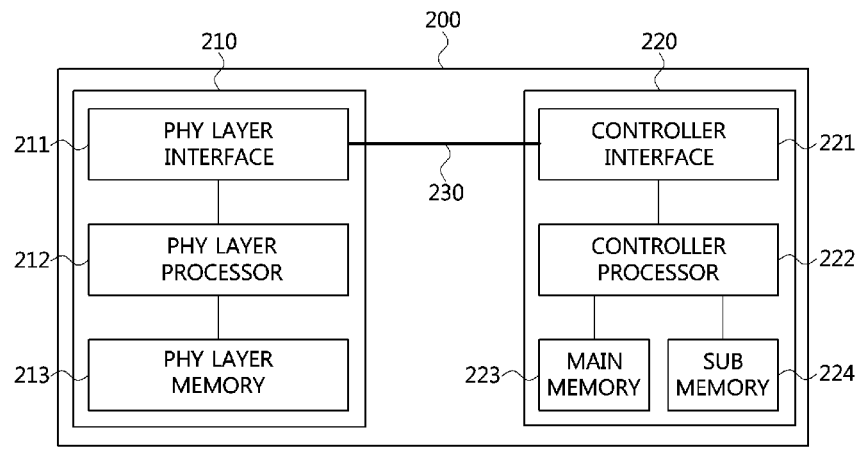
FIG. 2 is a diagram showing a communication node constituting a vehicle network according to embodiments of the present disclosure.

FIG. 2 is a diagram showing a communication node constituting a vehicle network according to embodiments of the present disclosure. Notably, the various methods discussed below may be executed by a controller having a processor and a memory.

As shown in FIG. 2, a communication node 200 of a network may include a physical (PHY) layer 210 and a controller 220. In addition, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like). The PHY layer 210 and the controller 220 may be implemented as one system on chip (SoC), or alternatively may be implemented as separate chips.

Furthermore, the PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and a sub memory 224. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the sub memory 224. The memory control logic may be implemented to be included in the main memory 223 and the sub memory 224 or may be implemented to be included in the controller processor 222.

Furthermore, each of the main memory 223 and the sub memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The sub memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
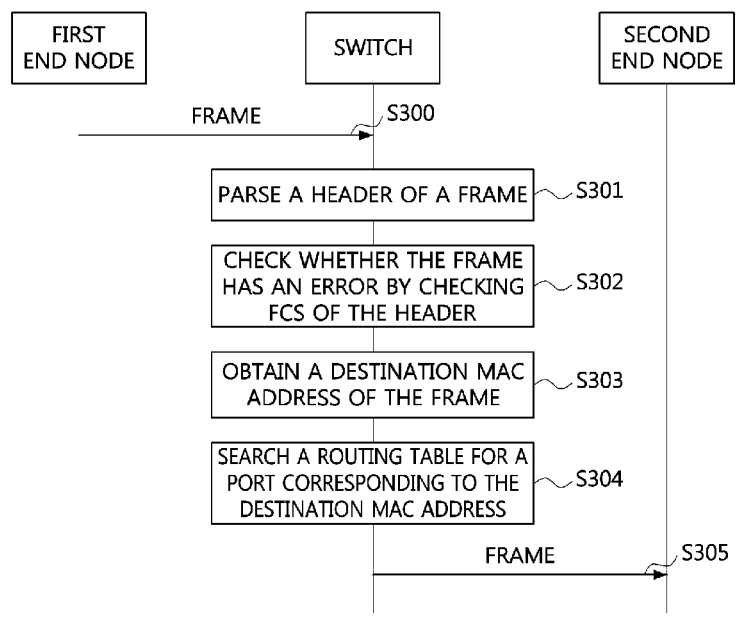
FIG. 3 is a sequence chart illustrating an embodiment of an operation method of a communication node constituting an Ethernet-based vehicle network.

FIG. 3 is a sequence chart illustrating an embodiment of an operation method of a communication node constituting an Ethernet-based vehicle network.

A switch, a first end node, and a second end node shown in FIG. 3 may constitute the Ethernet-based vehicle network described with reference to FIG. 1. Here, the switch may be a bridge. Further, each of the switch, first end node, and second end node may have the structure of the communication node 200 described with reference to FIG. 2.

Referring to FIG. 3, the first end node may transmit a frame to the switch (S300). On the other hand, the switch may have at least one port and may receive the frame from the first end node, for example, via a first port among the at least one port.

Then, the switch may parse a header of the frame received from the first end node (S301). The switch may check whether the frame is erroneous or not (S302). Specifically, the switch may perform a cyclic redundancy check (CRC) based on a frame check sequence (FCS) in a FCS field included in the received frame in order to check whether the frame is erroneous. That is, step S302 performed in the switch may refer to a process of checking integrity of the frame received from the first end node. Here, the frame transmitted from the first end node to the switch may be described with reference to FIG. 4.

Figure 4:
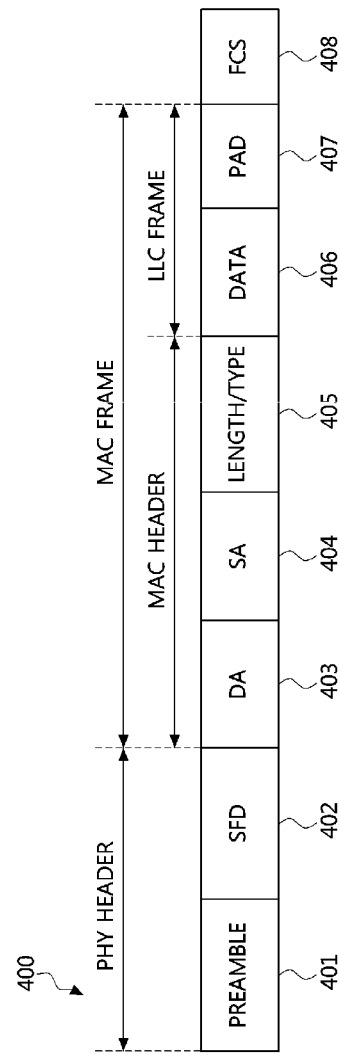
FIG. 4 is a conceptual diagram illustrating an embodiment of a frame used in an Ethernet-based vehicle network.

FIG. 4 is a conceptual diagram illustrating an embodiment of a frame used in an Ethernet-based vehicle network.

Referring to FIG. 4, a frame 400 may include a physical layer (PHY) header, a medium access control layer (MAC) frame, and an FCS field 408. In particular, the PHY header may include a preamble 401 and a start frame delimiter (SFD) field 402. Also, the MAC frame may be located after the SFD field 402. The MAC frame may include only a MAC header, or may include the MAC header and a logical link control (LLC) frame. The MAC header may include a destination address (DA) field 403, a source address (SA) field 404, and a length/type field 405. The DA field 403 may include identification information (e.g., MAC address) of a communication node receiving the corresponding MAC frame. The SA field 404 may include identification information (e.g., a MAC address) of a communication node transmitting the corresponding MAC frame.

The length/type field 405 may indicate the length of a data field 406 or an Ethernet type supported by the communication node transmitting the frame 400 based on the corresponding protocol. The LLC frame may include the data field 406 and may further include a pad field 407 as needed (e.g., to meet the minimum MAC frame size). Here, the pad field 407 may be added after the data field 406.

That is, referring again to FIG. 3, the switch may perform the CRC based on the FCS included in the FCS field 408 of the frame described with reference to FIG. 4. Then, when it is determined that there is no error in the received frame, the switch may obtain a destination MAC address in the DA field of the frame (S303). Then, the switch may search for a port corresponding to the destination MAC address based on a routing table (S304).

TABLE 1

| MAC address | Port |
|---|---|
| aaaa.aaaa.aaaa | 1 |
| bbbb.bbbb.bbbb | 2 |
| cccc.cccc.cccc | 3 |
| dddd.dddd.dddd | 4 |
| eeee.eeee.eeee | 5 |

Table 1 is a table showing an embodiment of the routing table of the switch. It may be assumed that the switch has five ports such as a first port, a second port, a third port, a fourth port, and a fifth port. In this case, the switch may have a routing table as shown in Table 1 above. That is, the routing table may be composed of a MAC address field and a port field. The MAC address field may include a MAC address of a communication node connected to the switch, and the port field may include information on a port mapped to the corresponding MAC address.

For example, the first port of the switch may be used to transmit and receive frames to/from a communication node having a MAC address of (aaaa.aaaa.aaaa), and the second port of the switch may be used to transmit and receive frames to/from a communication node having a MAC address of (bbbb.bbbb.bbbb).

Therefore, when the MAC address included in the DA field of the received frame is determined to be (aaaa.aaaa.aaaa) in the step S304, the switch may search the routing table for the port corresponding to the MAC address of (aaaa.aaaa.aaaa). In the above example, based on the routing table, the switch may identify that the port corresponding to the MAC address of (aaaa.aaaa.aaaa) is the first port. That is, the switch may search for the port corresponding to the destination MAC address among at least one port it has based on the routing table.

Thereafter, the switch may transmit the frame to the second end node through the searched port (S305). Accordingly, the second end node may receive the frame from the switch.

Figure 5:
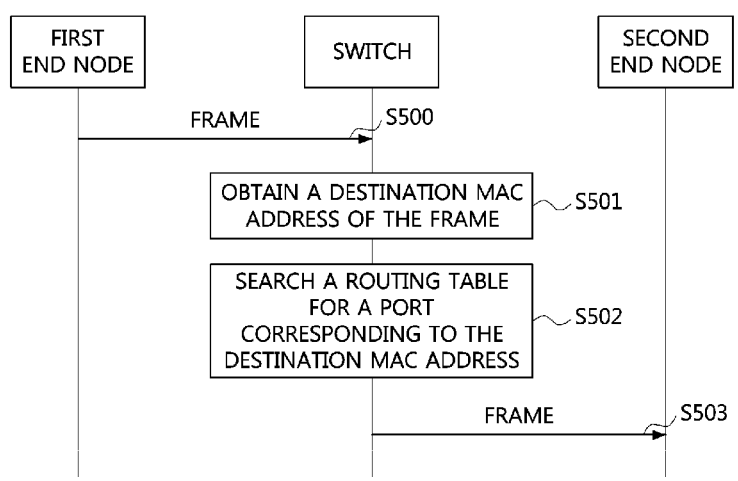
FIG. 5 is a sequence chart illustrating another embodiment of an operation method of a communication node constituting an Ethernet-based vehicle network.

FIG. 5 is a sequence chart illustrating another embodiment of an operation method of a communication node constituting an Ethernet-based vehicle network.

A switch, a first end node, and a second end node shown in FIG. 5 may constitute the Ethernet-based vehicle network described with reference to FIG. 1. Here, the switch may mean a bridge, and support a cut-through frame routing scheme, the frame routing scheme specified in the IEEE 802.1Qcc standard. Each of the switch, first end node, and second end node may have the structure of the communication node 200 described with reference to FIG. 2.

Referring to FIG. 5, the first end node may transmit a frame to the switch (S500). On the other hand, the switch may have at least one port and may receive the frame from the first end node, for example, via a first port among the at least one port. Then, the switch may obtain a destination MAC address in a DA field of the received frame without checking whether the frame received from the first end node is erroneous (S501).

Then, the switch may search for a port corresponding to the destination MAC address based on the routing table (S502). Thereafter, the switch may transmit the frame to the second end node through the searched port (S503). Accordingly, the second end node may receive the frame from the switch.

Then, the second end node may check whether the received frame is erroneous or not. The second end node may parse a header of the received frame and check whether the received frame is erroneous by performing a CRC based on a FCS included in a FCS field of the received frame.

Then, when the received frame has no error, the second end node may decode the received frame. The second end node may obtain data contained in the received frame through decoding of the received frame. Thereafter, the second end node may generate a frame indicating that the frame has been successfully received and transmit the generated frame to the switch.

That is, according to the operation method described with reference to FIG. 5, the switch may obtain the destination MAC address of the frame without performing a check on whether or not the frame received from the first end node has an error. Also, the switch may search a port corresponding to the obtained destination MAC address based on the routing table, and transmit the frame to the second end node through the searched port. Therefore, the switch may cause the frame to be routed to a wrong port due to a latent error in the destination MAC address of the frame.

FIG. 6 is a sequence chart illustrating an operation method of a first communication node in an Ethernet-based vehicle network according to an embodiment of the present disclosure.

Referring to FIG. 6, a first communication node may be a switch or a bridge. In addition, a first end node and a second end node shown in FIG. 6 may refer to communication nodes connected to the first communication node. In the below description, the first communication node may be described as being a switch, for example. Also, the first communication node may support the cut-through frame routing scheme, which is the frame routing scheme proposed in the IEEE 802.1Qcc standard.

The first end node may transmit a first frame to the switch (S600). On the other hand, the switch may have at least one port and may receive the first frame from the first end node, for example, via a first port among the at least one port.

Then, the switch may determine a port for transmitting the first frame received from the first end node. For this, the switch may obtain a destination MAC address of the first frame (S601). Here, the switch may obtain the destination MAC address included in a MAC header of the first frame without checking whether the first frame is erroneous according to the cut-through frame routing scheme.

Then, the switch may search for a port corresponding to the obtained destination MAC address of the first frame based on the routing table (S602). That is, the switch may identify a port corresponding to the destination MAC address of the first frame among the at least one port of the switch based on the routing table.

When the port corresponding to the destination MAC address does not exist, the switch may generate a second frame including an indicator indicating an occurrence of an error in the first frame. The error in the first frame may indicate that there is an error in the destination MAC address of the first frame. Here, the second frame may further include an indicator for instructing correction of the error for the first frame or an indicator for requesting transmission of an error-corrected frame in which the error of the first frame is corrected. In addition, the switch may generate an additional frame that includes the indicator instructing correction of the error for the first frame or the indicator for requesting transmission of the error-corrected frame for the first frame.

Then, the switch may transmit the generated second frame to the first end node (S604). Here, the first end node may be a communication node corresponding to a source address of the first frame. That is, the switch may transmit the second frame to a communication node corresponding to the MAC address included in the SA field of the first frame.

Thereafter, the switch may discard the first frame (S605). However, embodiments according to the present disclosure are not limited to discarding the first frame after the switch transmits the second frame to the first end node. That is, the switch may discard the first frame before generating the second frame or before transmitting the second frame to the first end node. For example, the time point at which the first frame is discarded in the switch may be preset to a time point such as a time point when the error in the first frame is recognized, or a time point after a predetermined time from the time point at which the error in the first frame is recognized.

Further, the switch may not operate in the cut-through type frame routing scheme after the error in the first frame occurs. That is, the cut-through frame routing scheme supported by the switch may be stopped. Therefore, the switch may check the frames received after the time at which the error of the first frame is recognized, and then obtain the destination MAC addresses of the frames received after that with performing error check operations on the received frames.

The first end node may receive the second frame from the switch in accordance with the transmission S604 of the switch. The first end node may identify the occurrence of the error in the first frame through the reception of the second frame. Specifically, the first end node may identify the indicator included in the second frame, and may identify the occurrence of the error in the first frame through the obtained indicator. That is, the first end node may recognize that there is an error in the destination MAC address of the first frame. Alternatively or additionally, the first end node may receive, from the switch, a frame including the indicator for requesting transmission of the third frame obtained by correcting the error of the first frame.

After the first end node obtains the indicator for requesting transmission of the third frame, the first end node may generate the third frame in which the error of the first frame is corrected (S606). Here, the first end node may generate the third frame without receiving the frame containing the indicator requesting the transmission of the third frame from the switch.

Thereafter, the first end node may transmit the third frame to the switch (S607). Thus, the switch may receive the third frame from the first end node. Then, the switch may perform a check on whether the third frame is erroneous (S608). The switch may parse a header of the third frame and check an error of the third frame by performing a CRC based on a FCS included in a FCS field of the third frame.

Thereafter, the switch may obtain a destination MAC address included in a DA field of the third frame (S609). Then, the switch may search a port corresponding to the destination MAC address of the third frame based on the routing table (S610). Then, the switch may transmit the third frame to the second end node through the searched port (S611).

On the other hand, the second end node may receive the third frame from the switch. Then, the second end node may check whether or not the third frame is erroneous. The second end node may parse the header of the third frame and perform a CRC based on the FCS included in the FCS field of the third frame.

When the second end node determines that there is no error in the third frame, the second end node may decode the third frame. That is, the switch may obtain the data contained in the third frame through decoding of the third frame. Then, the second end node may generate a fourth frame indicating that the third frame has been successfully received and transmit the fourth frame to the switch.

As described above, according to the operation method of the first communication node described with reference to FIG. 6, when a routing error of a received frame occurs due to an error of a destination MAC address of the received frame, the switch supporting the cut-through frame routing scheme may notify a communication node corresponding to a source address of the received frame that the destination MAC address of the frame has an error. In addition, the switch may stop the cut-through frame routing scheme after the routing error of the frame occurs, perform checks on errors in frames received after the routing error of the frame occurs, and then perform the routing of the frames.

FIG. 7 is a sequence chart illustrating an operation method of a first communication node in an Ethernet-based vehicle network according to another embodiment of the present disclosure.

Referring to FIG. 7, a first communication node may be a switch or a bridge. In addition, a first end node and a second end node shown in FIG. 7 may refer to communication nodes connected to the first communication node. In the below description, the first communication node may be described as being a switch, for example. The first communication node may support the cut-through frame routing scheme, which is the frame routing scheme proposed in the IEEE 802.1Qcc standard.

The first end node may transmit a first frame to the switch (S700). On the other hand, the switch may have at least one port and may receive the first frame from the first end node, for example, via a first port among the at least one port.

Then, the switch may determine a port for transmitting the first frame received from the first end node. For this, the switch may obtain a destination MAC address of the first frame (S701). Here, the switch may obtain the destination MAC address included in a MAC header of the first frame without checking whether the first frame is erroneous.

Then, the switch may search for a port corresponding to the obtained destination MAC address of the first frame based on the routing table (S702). That is, the switch may identify a port corresponding to the destination MAC address of the first frame among the at least one port of the switch based on the routing table.

When a port corresponding to the destination MAC address exists in the routing table, the switch may transmit the first frame to the second end node through the corresponding port (S703). That is, the steps S700 to S703 performed by the switch may mean a routing process for determining a transmission path of the first frame.

For example, the switch may have a first port, a second port, and a third port, and may receive the first frame from the first end node through the first port thereof. Then, the switch may search a port corresponding to the destination MAC address of the first frame among the second port and the third port based on the routing table. The switch may then transmit the first frame to the second end node via the second port if the second port is identified as the port corresponding to the destination MAC address of the first frame.

The second end node may receive the first frame from the switch. Then, the second end node may check whether or not the first frame is erroneous (S704). Specifically, the second end node may perform a CRC based on a FCS of a FCS field included in the first frame.

When it is determined that an error exists in the first frame, the second end node may generate a second frame including an indicator indicating the occurrence of the error in the first frame (S705). Here, the occurrence of the error in the first frame may mean that there is an error in the destination MAC address of the first frame and the first frame has been transmitted to the second end node which is a wrong destination.

Then, the second end node may transmit the generated second frame to the switch (S706). Here, the second end node may transmit the second frame to a communication node corresponding to the MAC address included in the SA field of the first frame, that is, the communication node corresponding to the source address.

The switch may receive the second frame from the second end node. Then, the second frame may be transmitted to the first end node (S707). Here, the communication node corresponding to the source address of the first frame may be the first end node. The second frame transmitted from the switch and the second end node may indicate that there is an error in the destination MAC address of the first frame. In addition, the switch may further transmit a frame including an indicator requesting transmission of an error-corrected frame in which the error in the first frame is corrected. Additionally or alternatively, the switch may further include an indicator in the second frame requesting transmission of the error-corrected frame of the first frame.

Here, the second end node may generate a third frame including an indicator for instructing error checks of the frames received after that (S708). Thereafter, the second end node may transmit the generated third frame to the switch (S709). Here, the indicator for instructing the error checks of the frames included in the third frame may be an indicator for requesting routing of frames after performing error checks on the frames transmitted from the switch. That is, it may have the same meaning as requesting to stop the cut-through frame routing scheme, which is a current frame routing scheme of the switch.

The indicator for instructing the error checks on the frames may be transmitted as included in the second frame, instead of the third frame. In other words, the switch may not generate the third frame, but may include the indicator in the second frame and transmit it to the switch.

On the other hand, the switch may receive the third frame from the second end node. Then, the switch may obtain the indicator included in the received third frame, and may be informed by the obtained indicator that the cut-through frame routing scheme is requested to be stopped. Thus, the switch may perform error check operations on the frames received after the reception of the third frame.

On the other hand, the first end node may receive the second frame from the switch. The first end node may obtain the indicator included in the second frame and may identify the occurrence of the error in the first frame through the obtained indicator. That is, the first end node may recognize that there is an error in the destination MAC address of the first frame.

Then, the first end node may receive the frame including the indicator for requesting transmission of the error-corrected frame of the first frame from the switch. The first end node may obtain the indicator included in the received frame, and may identify that a fourth frame should be transmitted based on the obtained indicator. Thereafter, the first end node may generate the fourth frame in which the error of the first frame is corrected (S710).

Then, the first end node may transmit the fourth frame to the switch (S711). On the other hand, the switch may receive the fourth frame from the first end node. Then, the switch may check whether the fourth frame is erroneous (S712). The switch may parse a header of the fourth frame and check whether the fourth frame is erroneous by performing a CRC based on a FCS included in a FCS field of the fourth frame.

Then, the switch may obtain a destination MAC address included in a DA field of the fourth frame (S713). Then, the switch may search a port corresponding to the destination MAC address of the fourth frame based on the routing table (S714). Then, the switch may transmit the fourth frame to the second end node through the searched port (S715).

On the other hand, the second end node may receive the fourth frame from the switch. Then, the second end node may check whether or not the fourth frame is erroneous. The second end node may parse a header of the fourth frame and perform a CRC based on a FCS included in a FCS field of the fourth frame.

Thereafter, when the fourth frame has no error, the second end node may decode the fourth frame. That is, the second end node may obtain data included in the fourth frame through decoding of the fourth frame. Then, the second end node may generate a fifth frame indicating that the fourth frame has been successfully received and transmit it to the switch.

As described above, according to the operation method of the first communication node described with reference to FIG. 7, the switch supporting the cut-through frame routing scheme in the vehicle network may transmit a frame to a communication node which is a wrong destination due to a routing error of the frame caused by an error of a destination MAC address in the frame. Here, the switch may receive a frame indicating that the routing error of the frame has occurred from the communication node that has received the frame, and inform the communication node corresponding to a source address of the frame that there is an error in the destination MAC address of the frame. In addition, the switch may stop the cut-through scheme after the routing error of the frame occurs, perform error checks on frames received after that, and then perform the routing of the frames.

The methods according to the embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node in an Ethernet-based vehicle network, the operation method comprising:
   receiving a first frame from a second communication node;
   obtaining a destination address of the first frame; and
   transmitting a second frame, which includes a first indicator for indicating an occurrence of an error in the first frame when a port corresponding to the destination address does not exist in a routing table and a second indicator for instructing transmission of an error-corrected frame in which the error in the first frame is corrected, to a communication node corresponding to a source address of the first frame.

2. The operation method according to claim 1, wherein the destination address is obtained from a medium access control (MAC) header of the first frame.

3. The operation method according to claim 1, further comprising discarding the first frame.

4. The operation method according to claim 1, wherein the second frame further includes a third indicator for instructing correction of the error in the first frame.

5. The operation method according to claim 1, further comprising:
   receiving a third frame from the second communication node;
   performing an error check operation on the third frame;
   obtaining a destination address of the third frame when the third frame has no error; and
   transmitting the third frame through a port corresponding to the destination address of the third frame based on the routing table.

6. The operation method according to claim 1, wherein the first communication node is a switch or a bridge, and
   wherein the second communication node is an end node connected to the first communication node.

7. The operation method according to claim 1, wherein the first communication node supports a cut-through frame routing scheme.

* * * * *